United States Patent Office 3,513,201
Patented May 19, 1970

3,513,201
PROCESS FOR PREPARING 5-(3-ALKYLAMINO-PROPYL)-5H-DIBENZO[a,d]CYCLOHEPTENES
Max Tishler, Westfield, John M. Chemerda, Metuchen, and Janos Kollonitsch, Westfield, N.J., assignors to Merck & Co., Inc., Rahway, N.J., a corporation of New Jersey
No Drawing. Continuation of application Ser. No. 207,395, July 3, 1962. This application Oct. 25, 1966, Ser. No. 589,465
Int. Cl. C07c 85/02, 101/12, 101/16
U.S. Cl. 260—570.8                    2 Claims

ABSTRACT OF THE DISCLOSURE

Compounds prepared by the reaction of alkali metal derivatives of 5H-dibenzo[a,d]cycloheptene with N-(halopropyl)-N-methyl carbamic acid esters to form an intermediate 5 - [3 - (N-carbethoxy)-amino-N-methylpropyl]-5H-dibenzo[a,d]cycloheptene, followed by hydrolysis to produce the pharmacologically active 5 - (3 - alkylaminopropyl)-5H-dibenzo[a,d]cycloheptene.

This application is a streamline continuation of Ser. No. 207,395, filed July 3, 1962.

This invention relates to a process for the production of 5H-dibenzo[a,d]cycloheptenes. In particular, the invention relates to the preparation of 5H-dibenzo[a,d]cycloheptenes which are substituted at the 5-position with a secondary aminopropyl. More particularly, the invention is concerned with the preparation of 5-(3-methylaminopropyl)-5H-dibenzo[a,d]cycloheptene. The invention also relates to novel compounds utilized in the process and their preparation.

In accordance with the process of the present invention, an alkali metal derivative of 5H - dibenzo[a,d]cycloheptene is reacted with an N-(halopropyl)-N-methyl carbamic acid ester and the resulting urethane derivative hydrolyzed to form the desired product. This process may be illustrated as follows:

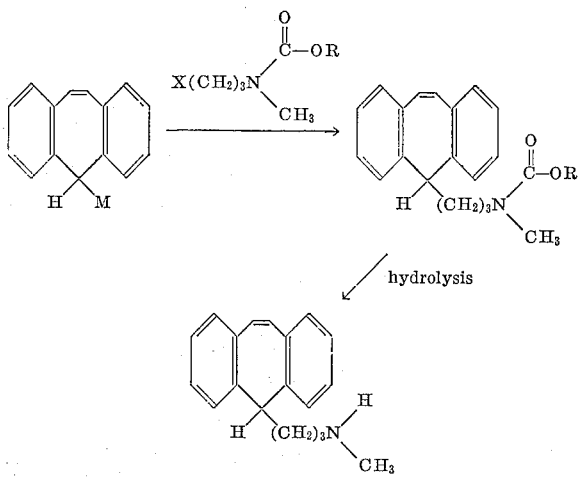

wherein M represents an alkali metal such as sodium, potassium or lithium; X is a halogen, preferably chlorine or bromine; and R is a radical selected from the group consisting of alkyl, cycloalkyl, aralkyl and aryl. The compounds may also have substituents on one or both of the benzenoid rings and/or on the propyl chain. It will be readily apparent to those skilled in the art that inasmuch as the R group is removed during the process, it is not critical which particular group is utilized to form the intermediate ester and the choice thereof is subject only to the limitations of ease of hydrolysis and other practical and economical considerations. However, the preferred groups are alkyl and aryl.

The starting compound, namely, the alkali metal derivative of 5H-dibenzo[a,d]cycloheptene may be readily prepared by reacting 5H-dibenzo[a,d]cycloheptene with a metalating reagent such as, for example, sodium amide, potassium amide, phenylsodium, butyllithium and the like. The sodium and potassium derivatives may be prepared using the process described by Villani, J. Med. and Pharm. Chem. 5, pp. 373–382 (1962). The lithium derivative may be prepared in analogous manner using butyllithium.

The N - (halopropyl) - N - methyl carbamic acid esters may be prepared by reacting the dimethylaminopropyl halide with a halogen formate as illustrated below:

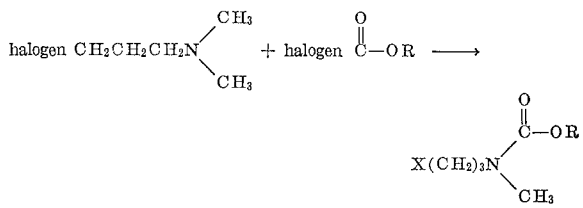

wherein X and R are as previously defined. However, as pointed out hereinabove, although R is preferably an alkyl or aryl radical, it is not critical which particular group is utilized to form the halogen formate since the group is subsequently removed during the process. The halogen substituents of the above reactants may be the same or different. Preferably, they are the same and either chlorine or bromine.

The reaction is suitably carried out in the presence of an inert, substantially anhydrous organic solvent, although it may be carried out in the absence of a solvent since the reactants themselves can be utilized for this purpose. The choice of solvent, when employed, is not critical and a wide variety can be utilized. Representative of these are the aromatic hydrocarbons such as benzene, toluene and the like; aliphatic hydrocarbons such as heptene, hexane and the like; ethers such as diethylether, diamylether and the like. The temperature at which the reaction is carried out is not critical. The reaction may be carried out at room temperature or elevated temperatures up to the reflux temperature of the system. Likewise, the ratio of reactants is not critical and equimolar amounts may be used although it is preferred to employ an excess of the haloformate. After completion of the reaction, the solvent is removed and the desired product recovered. Further purification of the product can be achieved by fractional distillation under vacuum.

The reaction between the alkali metal derivative of 5H-dibenzo[a,d]cycloheptene and the carbamic acid ester is carried out in an inert, substantially anhydrous organic solvent. The choice of solvent is not critical and any one of those which may be employed in the preparation of the carbamic acid ester described above may be used. Since the same solvent may be used in carrying out the reaction as is used in the preparation of the carbamic acid esters, it will be appreciated that the carbamic acid ester need not be isolated prior to carrying out the reaction with the alkali metal derivative. Equimolar amounts of reactants are preferably employed and the reaction proceeds at room temperature. However, the temperature is not critical and elevated temperatures up to the reflux temperature of the system may be used. After completion of the reaction, the solvent is removed and the urethane derivative recovered. Further purification can be achieved by fractional distillation under vacuum.

Conversion to the 5-(3-methylaminopropyl)-5H-dibenzo[a,d]cycloheptene is accomplished by hydrolyzing the urethane derivative. While this may be carried out under either acidic or basic conditions, employing alcoholic solutions of potassium hydroxide, sodium hydroxide, hydrochloric acid, acetic acid and the like as the hydrolyzing medium, the hydrolysis is preferably conducted under basic conditions.

The end compound, namely, 5-(3-methylaminopropyl)-5H-dibenzo[a,d]cycloheptene, prepared by the process of the present invention, is useful in the treatment of mental health conditions as it is an antidepressant and serves as a mood elevator or a psychic energizer. For this purpose, the daily dosage is within the range of 5–250 mg., preferably taken in divided amounts over the day.

The following examples are given for purposes of illustrating the present invention and are not to be construed as limiting the invention.

EXAMPLE 1

Preparation of N-3-chloropropyl-N-methylcarbamic acid ethyl ester 158 g. (1 mole) of 3-dimethylaminopropylchloride hydrochloride is dissolved in 250 ml. of water and the solution cooled to 0 to 5° C. 250 ml. of ether and 105 ml. of 11.7 N NaOH solution are then added slowly with stirring. After separation of the layers, the ether layer is recovered and the aqueous layer extracted with five 100 ml. portions of ether. The combined ethereal extracts are then washed with 100 ml. of water and dried over $MgSO_4$. The ether solution containing the 3-dimethylaminopropylchloride free base is then slowly added to a solution of 326 g. (3 mole) of ethyl chloroformate in 600 ml. of benzene while stirring at 20–25° C. The ether is distilled off and the benzene solution refluxed for 2 hours. The solution is then washed with three 200 ml. portions of water, then three 200 ml. portions of 1 N HCl and water again and then dried over $MgSO_4$ and evaporated to dryness in vacuo yielding substantially pure N-3-chloropropyl-N-methylcarbamic acid ethyl ester.

EXAMPLE 2

Following the procedure of Example 1 and employing equivalent quantities of phenyl chloroformate and benzyl bromoformate in place of ethyl chloroformate, there is obtained, respectively, N-3-chloropropyl-N-methylcarbamic acid phenyl ester and N-3-bromopropyl-N-methylcarbamic acid benzyl ester.

EXAMPLE 3

Preparation of 5-[3-(N-(carbethoxy)-amino-N-methyl)-propyl]-5H-dibenzo[a,d]cycloheptene To a suspension of 3.9 g. of potassium amide is slowly added a solution of 19.2 g. (0.1 mole) of 5H-dibenzo[a,d]cycloheptene in 600 ml. of ether with stirring. The suspension is refluxed with stirring for 3 hours, then cooled to room temperature and a solution of 0.1 mole of N-3-chloropropyl-N-methylcarbamic acid ethyl ester in 100 ml. of ether added. The mixture is then refluxed with stirring for 5 hours and then 100 ml. of water added. The ether layer is then washed with dilute hydrochloric acid, then water and then dried over magnesium sulfate and evaporated to dryness yielding 5-[3-(N-(carbethoxy)-amino-N-methyl)-propyl]-5H-dibenzo[a,d]cycloheptene.

EXAMPLE 4

Following the procedure of Example 3 and employing equivalent quantities of N-3-chloropropyl-N-methylcarbamic acid phenyl ester and N-3-bromopropyl-N-methylcarbamic acid benzyl ester there is obtained, respectively, 5-[3-(N-(carbophenoxy)-amino-N-methyl)-propyl]-5H-dibenzo[a,d]cycloheptene and 5-[3-(N-(carbobenzyloxy)-amino-N-methyl)-propyl]-5H-dibenzo[a,d]cycloheptene.

EXAMPLE 5

Preparation of 5-(3-methylaminopropyl)-5H-dibenzo[a,d]cycloheptene from 5-[3-(N-(carbethoxy)-amino-N-methyl)-propyl]-5H-dibenzo[a,d]cycloheptene 29.5 g. of 5-[3-(N-(carbethoxy)-amino-N-methyl)-propyl]-5H-dibenzo[a,d]cycloheptene is refluxed for 24 hours under nitrogen in a solution of 36.3 g. of potassium hydroxide in 378 ml. of n-butanol. After cooling to room temperature, the solvent is evaporated in vacuo, the residue is stirred with 200 ml. of water, 300 ml. of n-hexane, the layers separated, the water layer extracted with 100 ml. of n-hexane and the combined hexane layers washed with water (2×100 ml.) and then with 0.5 N sulfuric acid (100×80×80 ml.). The acid solution is then alkalized and extracted with ether (2×150 ml. and 1×100 ml.), dried over $MgSO_4$ and the solution evaporated to dryness yielding substantially pure 5-(3-methylaminopropyl)-5H-dibenzo[a,d]cycloheptene.

EXAMPLE 6

Following the procedure of Example 5 and employing equivalent quantities of

5-[3-(N-(carbophenoxy)-amino-N-methyl)-propyl] 5H-dibenzo[a,d]cycloheptene and
5-[3-(N-(carbobenzyloxy)-amino-N-methyl)-propyl]-5H-dibenzo[a,d]cycloheptene in place of 5-[3-(N-(carbethoxy)-amino-N-methyl)-propyl]-5H-dibenzo[a,d]cycloheptene, there is similarly obtained 5-(3-methylaminopropyl)-5H-dibenzo[a,d]cycloheptene.

We claim:

1. A process which comprises reacting a dimethylaminopropyl halide wherein the halide is selected from the group consisting of chloride and bromide with a halogen formate having the formula

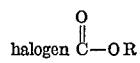

wherein said halogen is bromine or chlorine, to form a carbamic acid ester of the formula

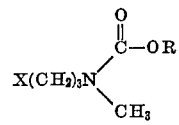

wherein X is a halogen selected from the group consisting of bromine or chlorine and R is selected from the group consisting of loweralkyl, phenyl and benzyl radicals and contacting said carbamic acid ester with 5-alkali metal 5H-dibenzo[a,d]cycloheptene to form the corresponding urethane derivative having the formula

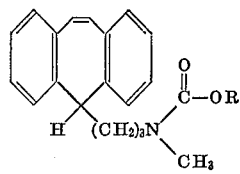

wherein R is as defined above and then hydrolyzing said urethane derivative to form the compound 5-(3-methylaminopropyl)-5H-dibenzo[a,d]cycloheptene.

2. A process which comprises intimately contacting 3-(N,N-dimethylamino)propyl chloride and ethylchloroformate to produce N-(3-chloropropyl)-N-methylcarbamic acid ethyl ester and contacting said carbamic acid ethyl ester with a solution of a 5-potassium derivative of 5H-dibenzo[a,d]cycloheptene to form 5-[3-(N-carbethoxyamino-N-methyl)propyl]5H-dibenzo[a,d]cycloheptene and hydrolyzing said dibenzocycloheptene to produce 5-(3-methylaminopropyl) - 5H - dibenzo[a,d]-cycloheptene.

References Cited

UNITED STATES PATENTS

| | | | |
|---|---|---|---|
| 2,649,473 | 8/1953 | Chenicek | 260—482 |
| 2,920,994 | 1/1960 | Epperly et al. | 167—30 |
| 2,985,660 | 5/1961 | Judd et al. | 260—293 |
| 3,019,255 | 1/1962 | Murfitt | 260—482 |
| 3,264,342 | 8/1966 | Schindler | 260—570.8 XR |
| 3,324,170 | 6/1967 | Kollonitsch | 260—570.8 XR |

FOREIGN PATENTS 618,034   2/1949   Great Britain.

OTHER REFERENCES

Wright et al.: "Journal Organic Chemistry," vol. 26, pp. 4057–60 (1961).

ROBERT V. HINES, Primary Examiner

U.S. Cl. X.R.

260—471, 482, 665, 999